US009303957B2

(12) United States Patent
Cronk

(10) Patent No.: US 9,303,957 B2
(45) Date of Patent: Apr. 5, 2016

(54) GROUND ENGAGING ASSEMBLY FOR APPLYING FORCE TO GROUND AND GROUND ENGAGING VEHICLE INCORPORATING SUCH ASSEMBLY

(71) Applicant: Pearson Engineering Limited, Newcastle upon Tyne (GB)

(72) Inventor: Richard Leonard Cronk, Belsay (GB)

(73) Assignee: Pearson Engineering Limited, Newscastle Upon Tyne (GB)

( * ) Notice: Subject to any disclaimer, the term of this patent is extended or adjusted under 35 U.S.C. 154(b) by 0 days.

(21) Appl. No.: 13/911,822

(22) Filed: Jun. 6, 2013

(65) Prior Publication Data
US 2013/0327203 A1    Dec. 12, 2013

(30) Foreign Application Priority Data
Jun. 8, 2012    (EP) .................................... 12171388

(51) Int. Cl.
*F41H 11/138*    (2011.01)
*F41H 11/12*    (2011.01)
*F41H 11/16*    (2011.01)
*F41H 11/30*    (2011.01)
*A01B 29/04*    (2006.01)

(52) U.S. Cl.
CPC .............. *F41H 11/168* (2013.01); *F41H 11/30* (2013.01); *A01B 29/04* (2013.01)

(58) Field of Classification Search
CPC ....... F41H 11/12; F41H 11/13; F41H 11/138; F41H 11/16; F41H 11/161; F41H 11/162; F41H 11/168; F41H 11/18; F41H 11/30; F41H 7/00; F41H 7/005; F41H 7/10
USPC ................................................ 89/1.13, 37.09
See application file for complete search history.

(56) References Cited

U.S. PATENT DOCUMENTS 3,771,413 A * 11/1973 Sieg et al. ....................... 89/1.13
4,993,499 A    2/1991 Bourgault et al.
6,119,792 A * 9/2000 Almer ......................... 172/799.5
(Continued)

FOREIGN PATENT DOCUMENTS

WO    WO 2009/038762 A1    3/2009

OTHER PUBLICATIONS

European Search Report mailed Nov. 21, 2012 for EP Application No. EP 12171388.7.

*Primary Examiner* — Bret Hayes
*Assistant Examiner* — Derrick Morgan
(74) *Attorney, Agent, or Firm* — Kilpatrick Townsend & Stockton LLP

(57) ABSTRACT

A roller assembly for applying force to the ground is disclosed. The assembly includes a body adapted to be mounted to a vehicle for moving the assembly, and supports including a first support member supporting a plurality of rollers for applying force to the ground, and a respective piston connected to each roller, the rollers connected via a respective pressure chamber to the corresponding first support member to resist movement of the pistons towards the first support member. The first support member pivotably connected to the body via a first axis such that pivoting movement of the first support member about the first axis as a result of a first torque about an axis has a component about an axis transverse to the direction of travel such that engagement of the rollers with the ground causes a second torque on the first support member opposing the first torque.

11 Claims, 9 Drawing Sheets

(56) References Cited

U.S. PATENT DOCUMENTS

| | | | |
|---|---|---|---|
| 6,568,030 B1* | 5/2003 | Watanabe et al. | 16/44 |
| 6,915,728 B2* | 7/2005 | Renwick et al. | 89/1.13 |
| 8,522,661 B2* | 9/2013 | Hembise et al. | 89/1.13 |
| 2003/0145717 A1* | 8/2003 | Yamamoto et al. | 89/1.13 |
| 2006/0266576 A1* | 11/2006 | Eckhoff | 180/900 |
| 2011/0048217 A1* | 3/2011 | Ulrich et al. | 89/1.13 |
| 2011/0232468 A1* | 9/2011 | Hembise et al. | 89/1.13 |
| 2011/0296976 A1* | 12/2011 | Simula et al. | 89/1.13 |
| 2012/0186421 A1* | 7/2012 | Firth | 89/1.13 |
| 2013/0014633 A1* | 1/2013 | Diaz | 89/1.13 |
| 2013/0104727 A1* | 5/2013 | Wiesman et al. | 89/1.13 |
| 2014/0007756 A1* | 1/2014 | Diaz | 89/1.13 |
| 2014/0157975 A1* | 6/2014 | Firth | 89/1.13 |

* cited by examiner

GROUND ENGAGING ASSEMBLY FOR APPLYING FORCE TO GROUND AND GROUND ENGAGING VEHICLE INCORPORATING SUCH ASSEMBLY

This application claims priority to European Patent Application No. EP12171388.7, filed Jun. 8, 2012, entitled "Ground Engaging Assembly for Applying Force to Ground and Ground Engaging Vehicle Incorporating Such Assembly," the entirety of which is hereby incorporated by reference.

The present invention relates to a ground engaging assembly for applying force to the ground, and relates particularly, but not exclusively, to a roller assembly for applying force to the ground to detonate explosive devices such as mines. The invention also relates to a ground engaging vehicle incorporating such an assembly.

Ground engaging vehicles for detonating mines or other explosive devices are known which consist of a roller assembly mounted at a forward end of the vehicle having one or more rollers for applying pressure to the ground in front of the vehicle. A suspension arrangement for such a roller assembly 2 is shown in FIGS. 1 to 3. A plurality of ground engaging rollers 4 are independently mounted via respective pistons 6 and cooperating piston cylinders 8 defining gas containing pressure chambers 10 to a support 12 which is in turn pivotably mounted to a body (not shown) about a roll axis 14. The pistons 6 are slidably mounted to piston cylinders 8 to vary the volume of pressure chambers 10, such that compressive forces applied by the ground to the rollers 4 cause compression of the gas in the pressure chambers 10 to thereby produce a reaction force opposing the compressive forces.

FIG. 2 shows the roller assembly 2 of FIG. 1 when one of the rollers 4a encounters a depression in the ground. As a result of encountering a depression in the ground, the piston 6a corresponding to roller 4a extends, thereby increasing the gas volume in the corresponding pressure chamber 10a to reduce the force applied by the roller 4a to the ground, while the force applied to the ground by the other rollers 4b remains generally constant and higher than the force applied by the roller 4a. This provides the disadvantage that the force applied by the roller 4a may be insufficient to detonate an explosive device located in the depression.

A known roller assembly which attempts to address this problem is disclosed in WO 2009/038762 and is shown schematically in FIGS. 4 and 5, in which parts common to the embodiment of FIGS. 1 and 2 are denoted by like reference numerals but increased by 100. Roller assembly 102 comprises a plurality of ground engaging rollers 104 mounted, via respective pistons 106 slidable within respective piston cylinders 108 which are interconnected to define a single gas containing pressure chamber 110, to a support 112 which is in turn pivotably mounted to the body (not shown) about a roll axis 114. The interconnection of the piston cylinders 108 to define a single pressure chamber 110 causes the same pressure to be applied to each piston 106 connected to the same support 112. As a result, a roller 104a engaging a depression in the ground, although being mounted to a piston 106a extended compared with the other pistons 106 connected to the same support 112, does not apply a reduced force to the ground, thereby increasing the likelihood that sufficient force is applied to detonate any explosive device located in that depression.

However, when the roller assembly 102 of FIGS. 4 and 5 rolls (i.e. pivots about axis 114 parallel to the direction of travel of a vehicle (not shown) pushing the roller assembly 102), this arrangement suffers from the disadvantage illustrated by comparing FIGS. 3 and 5.

FIG. 3 illustrates the effect of pivoting of the body 12 of the roller assembly 2 of FIG. 1 about its roll axis 14, for example as a result of the roller assembly 2 encountering an uneven ground surface. Because the individual rollers 4 have pistons 6 which are extended to different extents, the pressures in the pressure chambers 10 vary and are greater for those pistons 6 which are extended to a lesser extent. This in turn generates a tuning moment urging the support 12 in the direction of arrow M about the roll axis 14, thereby tending to counteract the rolling motion and return the roller assembly 2 to its horizontal orientation as shown in FIG. 1.

In the roller assembly 102 shown in FIG. 5, on the other hand, because the force applied to each roller 14 is the same because of the single pressure chamber 110, no moment urging the support 112 about its roll axis 114 to the horizontal orientation is generated. As a result, additional apparatus is required to restore the roller assembly 102 to its horizontal orientation, thereby increasing the complexity of construction and the cost of the roller assembly 102.

Preferred embodiments of the present invention seek to overcome one or more of the above disadvantages of the prior art.

According to an aspect of the present invention, there is provided a ground engaging assembly for applying force to the ground, the assembly comprising:

a body adapted to be mounted to a vehicle for moving the assembly; and support means comprising at least one first support member adapted to support a plurality of ground engaging members, for applying force to the ground, at least one said first support member being adapted to be connected to a plurality of corresponding ground engaging members via respective second support members, wherein each said second support member comprises at least one piston sliding within a respective piston cylinder, the piston cylinders being interconnected to form a respective single pressure chamber applying the same pressure to each said piston to resist movement of said second support members towards the corresponding said first support member;

characterised in that at least one said first support member is pivotably connected to said body via a respective first axis such that pivoting movement of said first support member relative to the vehicle about said first axis as a result of a first torque about an axis parallel to a direction of travel of the vehicle in use has a component about an axis transverse to said direction of travel such that engagement of the corresponding said ground engaging members with the ground causes a second torque on said first support member, and wherein said second torque opposes said first torque.

By providing at least one said first support member pivotably connected to the body via a respective first axis such that pivoting movement of the first support member relative to the vehicle about the first axis as a result of a first torque about an axis parallel to a direction of travel of the vehicle in use has a component about an axis transverse to the direction of travel such that engagement of the corresponding ground engaging members with the ground causes a second torque on the first support member, and wherein the second torque opposes the first torque, this provides the advantage of avoiding the situation in which a ground engaging member engaging a depression in the ground applies a reduced force compared with other ground engaging members mounted to the same first support member, while correcting rolling motion of the ground engaging assembly. This in turn enables the ground engaging assembly to be produced at lower cost.

The body may comprise a first portion adapted to be mounted to the vehicle and a respective connecting member pivotably connected via a respective said first axis to at least one said first support member and via a respective second axis to said first portion.

A plurality of said ground engaging members in use may engage the ground rearwardly of the corresponding said second axis in a direction of travel of the vehicle.

This provides the advantage of providing a simple construction in which the ground engaging members become aligned in the correct orientation relative to the vehicle as a result of castoring movement of the ground engaging members.

At least one said connecting member may be mounted in use to the corresponding said first support member forwardly of the corresponding said second axis in a direction of travel of the vehicle.

This provides the advantage of enabling a simpler and more compact construction of the assembly.

At least one said second support member may comprise at least one respective piston slidably mounted relative to the corresponding said first support member.

This provides the advantage of enabling a simple and reliable construction of the assembly incorporating a plurality of second support members connected to a single pressure chamber.

The support means may comprise at least one third support member pivotably mounted to a respective said first support member, wherein at least one corresponding said second support member is adapted to pivot said third support member relative to the first support member to urge the corresponding said ground engaging member into contact with the ground.

This provides the advantage of enabling a simple construction of the apparatus in which the ground engaging force can be varied.

The assembly may further comprise a plurality of ground engaging members.

A plurality of said ground engaging members may comprise rollers.

The assembly may further comprise steering means for pivoting said body relative to the vehicle.

The steering means may comprise a plurality of actuators.

According to a further aspect of the present invention, there is provided a ground engaging vehicle comprising a vehicle body and a ground engaging assembly as defined above mounted to the vehicle body.

A preferred embodiment of the invention will now be described, by way of example only and not in any limitative sense, with reference to the accompanying drawings, in which.

Figure 1:
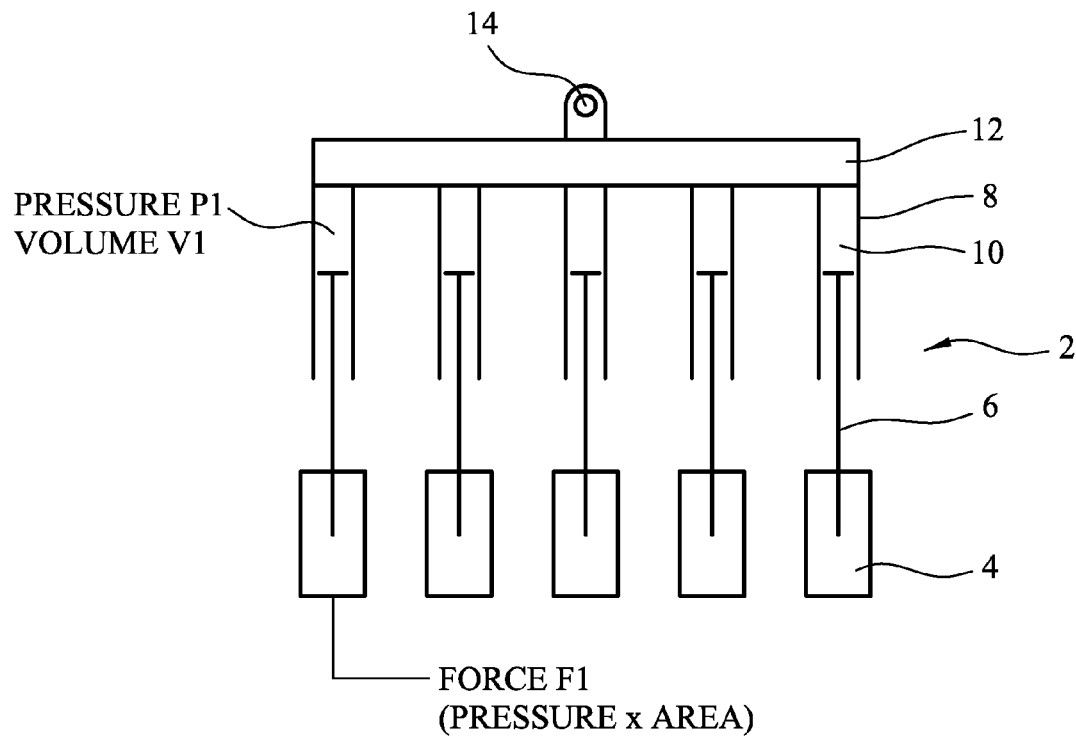
FIG. 1 is a schematic representation of a suspension of a first known roller assembly.
Figure 2:
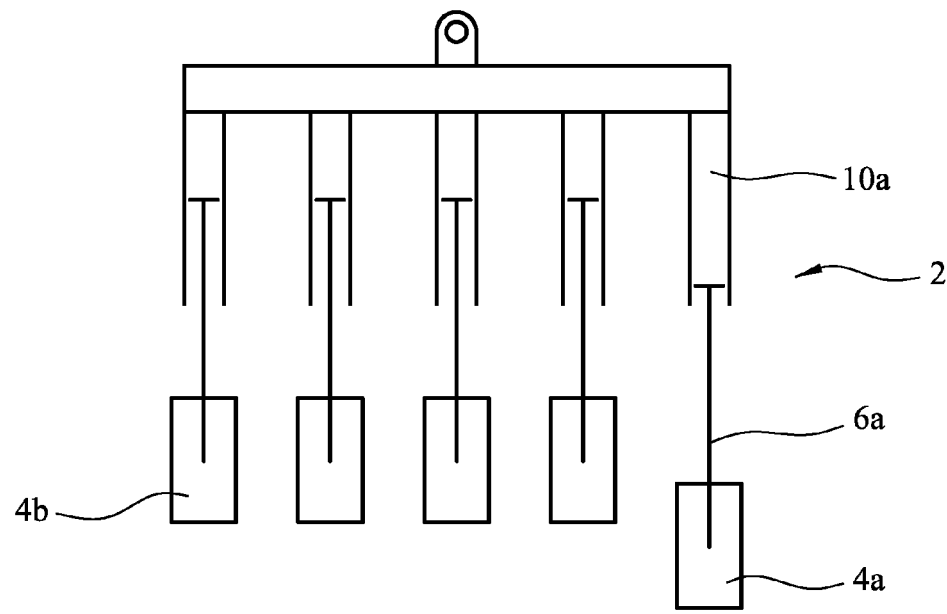
FIG. 2 is a schematic illustration of the roller assembly of FIG. 1 engaging a depression in the ground.
Figure 3:
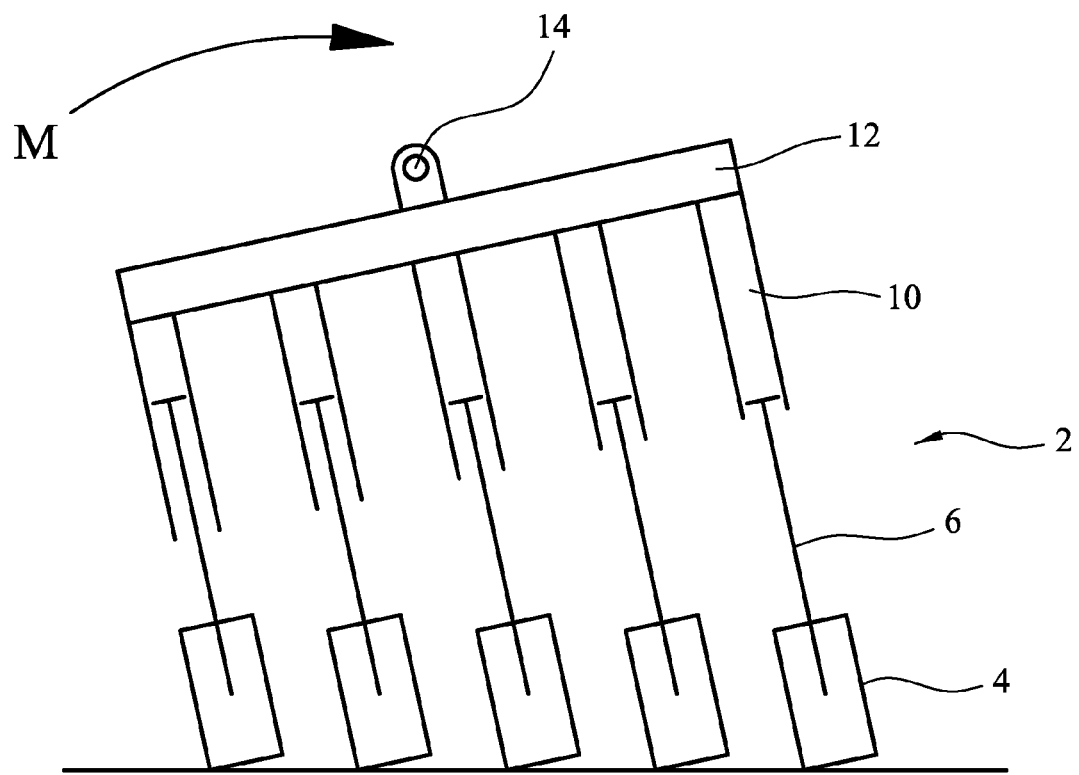
FIG. 3 is a schematic side view explaining roll countering operation of the suspension of FIG. 1.
Figure 4:
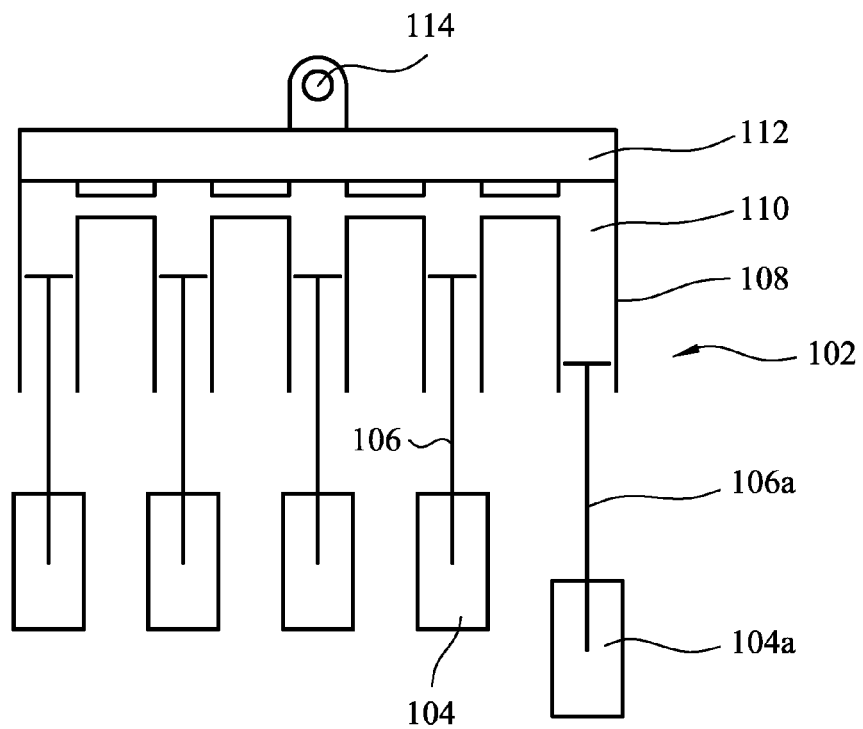
FIG. 4 is a schematic view illustrating a suspension of a second known roller assembly engaging a depression in the ground.
Figure 5:
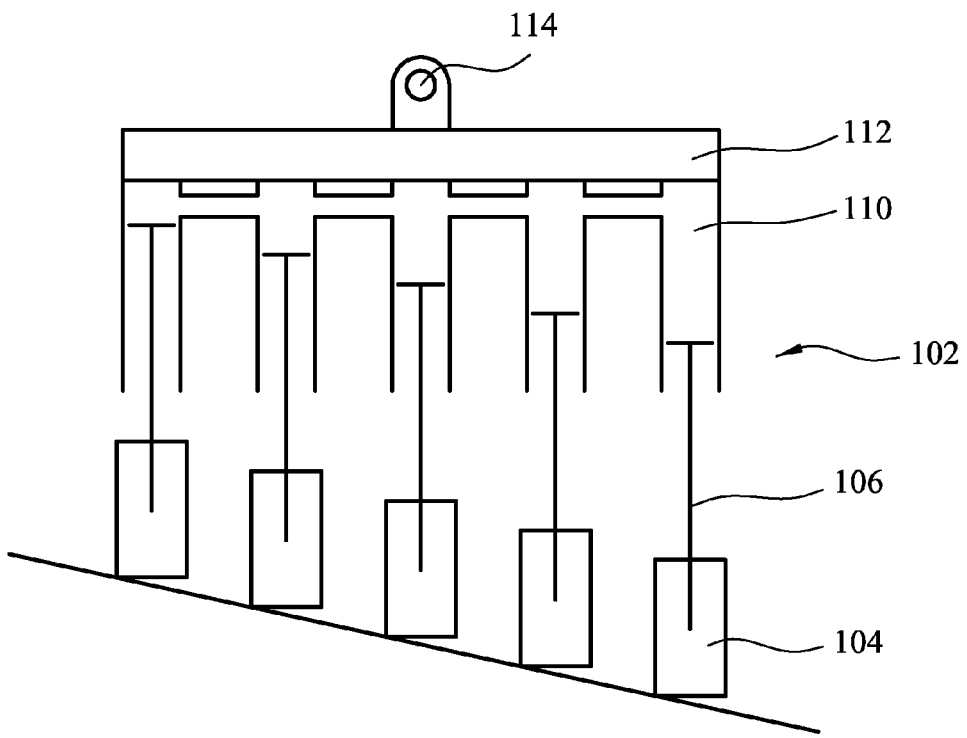
FIG. 5 is a side view explaining roll behaviour of the suspension of FIG. 4.
Figure 6:
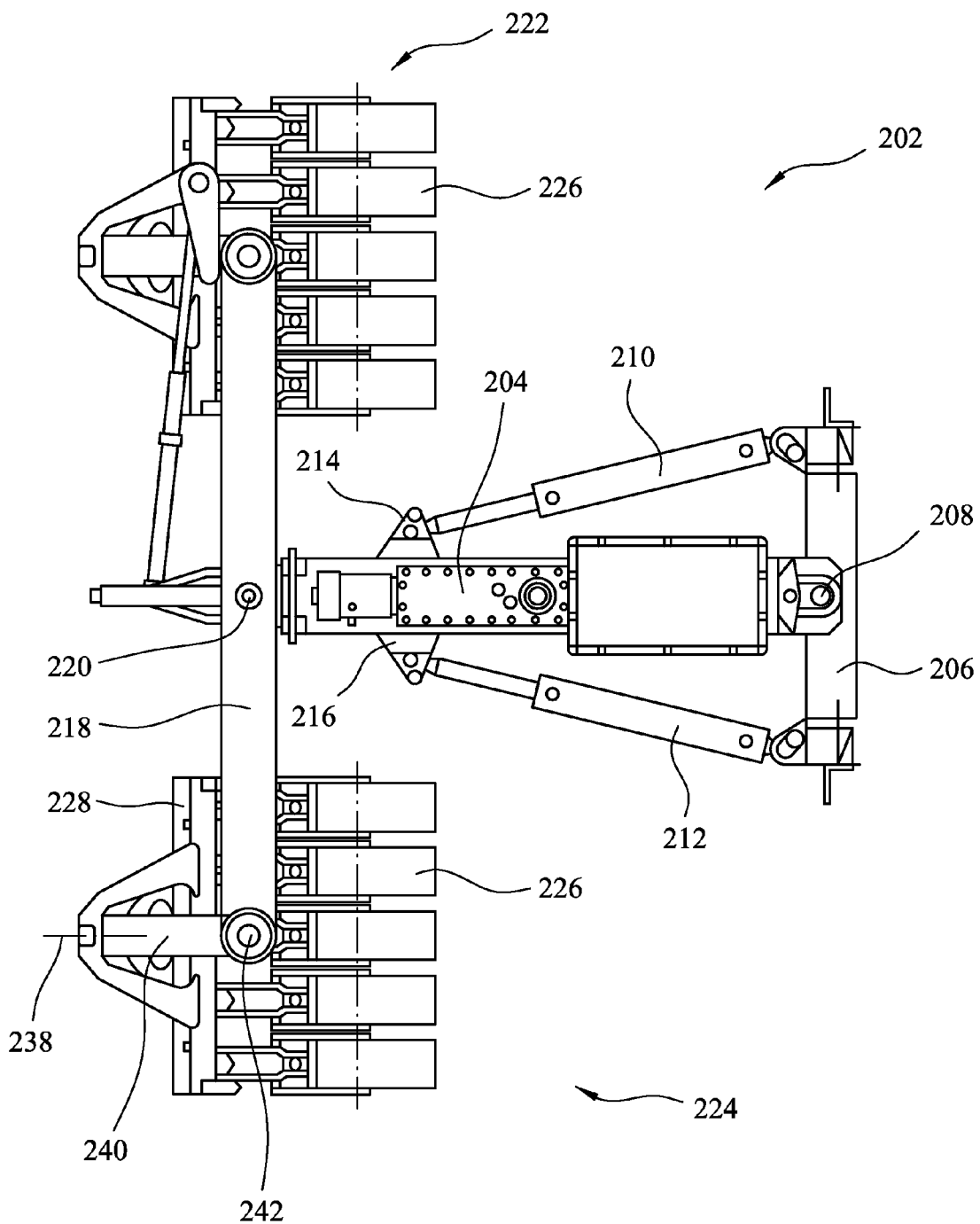
FIG. 6 is a plan view of a roller assembly embodying the present invention travelling forwards.
Figure 7:
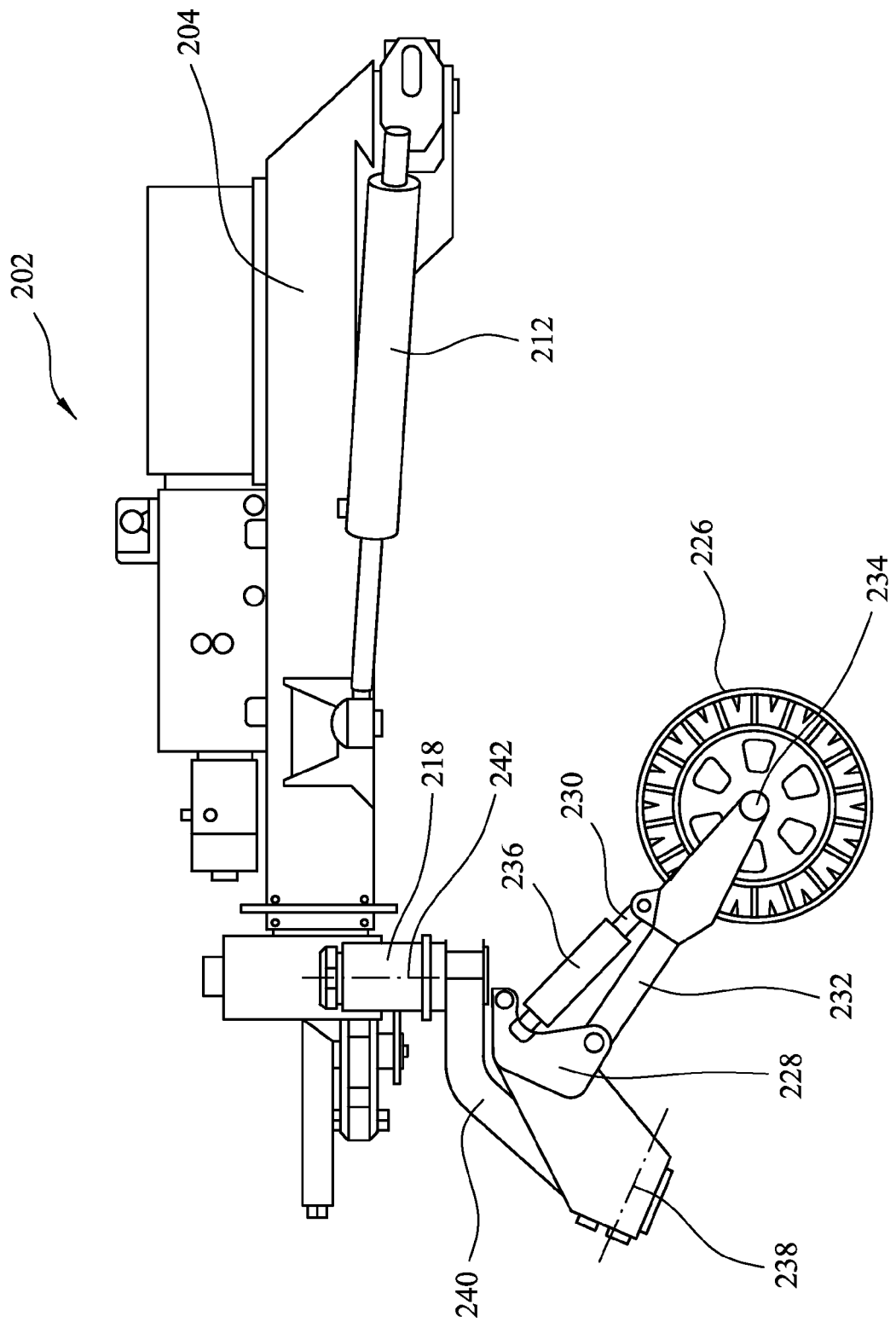
FIG. 7 is a side view of the roller assembly of FIG. 6.
Figure 8:
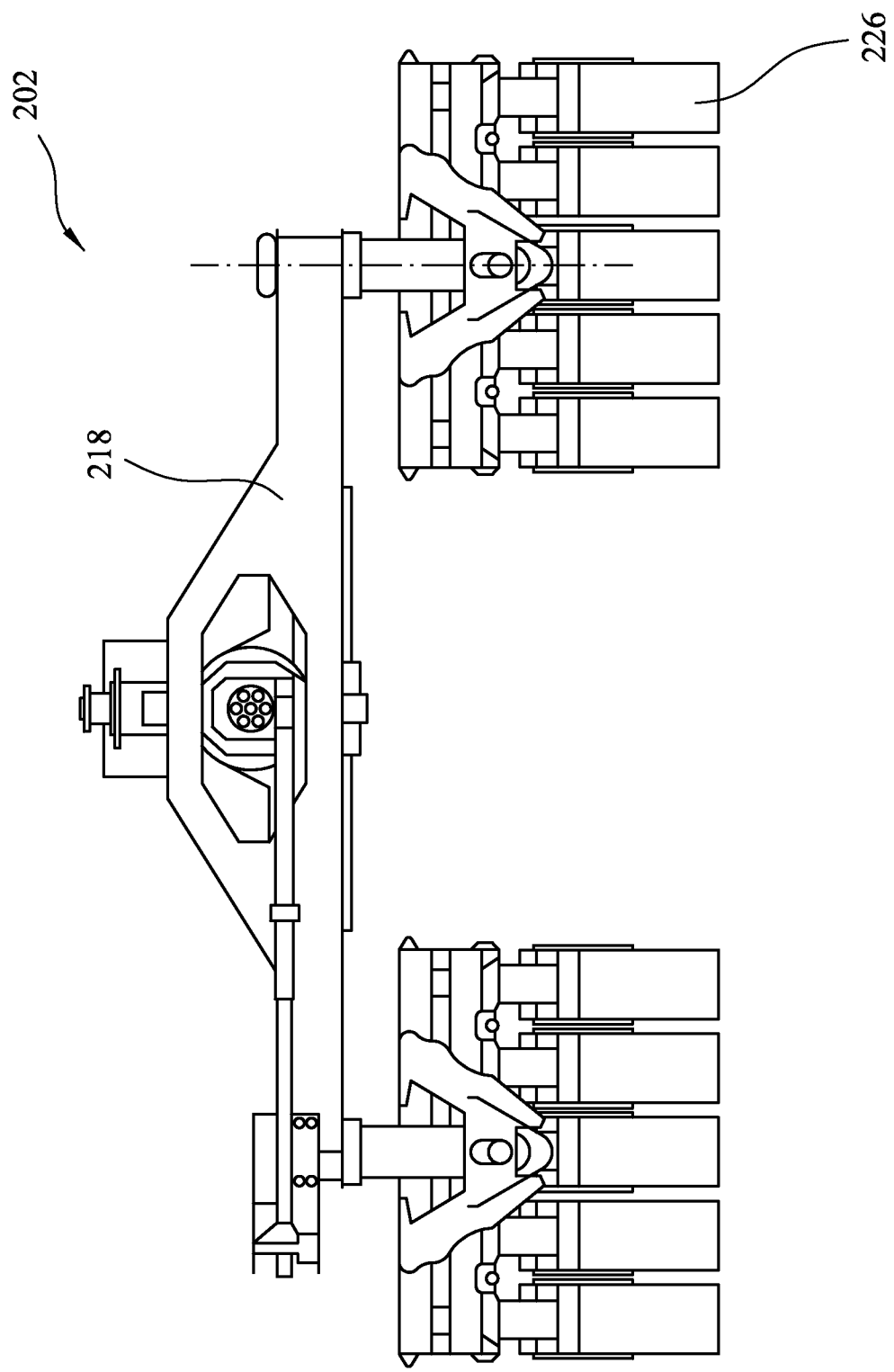
FIG. 8 is a front view of the roller assembly of FIG. 6.
Figure 9:
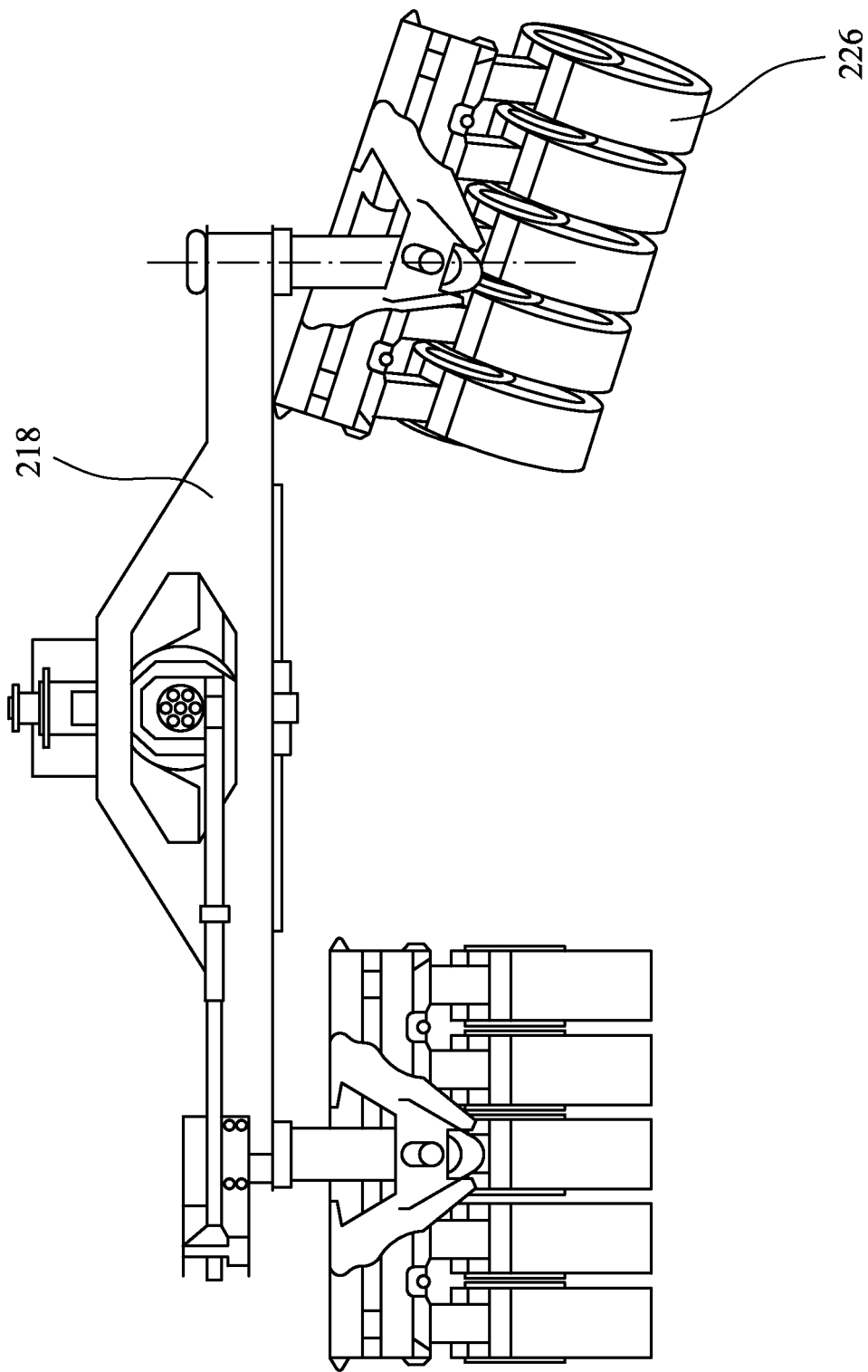
FIG. 9 is a front view of the roller assembly of FIG. 6 with one roller gang pivoted about castor and roll axes.

Referring to FIGS. 6 to 8, a roller assembly 202 embodying the present invention for applying force to the ground to detonate mines or other explosive devices comprises a main body 204 having a mounting portion 206 adapted to be mounted to a vehicle (not shown) for pushing the roller assembly 202. The main body 204 is pivotably mounted to the mounting portion 206 via pivot 208 and steering means in the form of a pair of actuators 210, 212 pivotably connected to the mounting means 206 and to respective brackets 214, 216 on the main body 204 enable pivoting of the main body 208 about pivot 208 relative to the mounting portion 206.

A transverse member 218, mounted to the main body 204 about a lockable adjustable pivot 220 for fine adjustment of the orientation of the transverse member 218 relative to the main body 204, supports a pair of roller gangs 222, 224, each of which has a plurality of ground engaging rollers 226 for detonating mines or like explosive devices. Roller support means includes a first support member 228 for each roller gang 222, 224, connected to each corresponding roller 226 via a respective second support member in the form of a piston 230 and a third support member in the form of a strut 232.

Each strut is pivotably connected at one of its ends to an axle 234 of the corresponding roller 226 and at its other end to the first support member 228. Each piston 230 is pivotably connected at one of its ends to the corresponding strut 232 and slides within a piston cylinder 236 pivotable mounted to the first support member 228. The piston cylinders 236 on each roller gang 222, 224 are interconnected to form a single pressure chamber applying the same pressure to each piston 230 so that approximately the same force is applied to each roller 226 of a roller gang 222, 224. The pressure chamber on each roller gang 222, 224 defines a gas spring which opposes movement of the individual rollers 226 towards the corresponding first support member 228.

Figure 10:
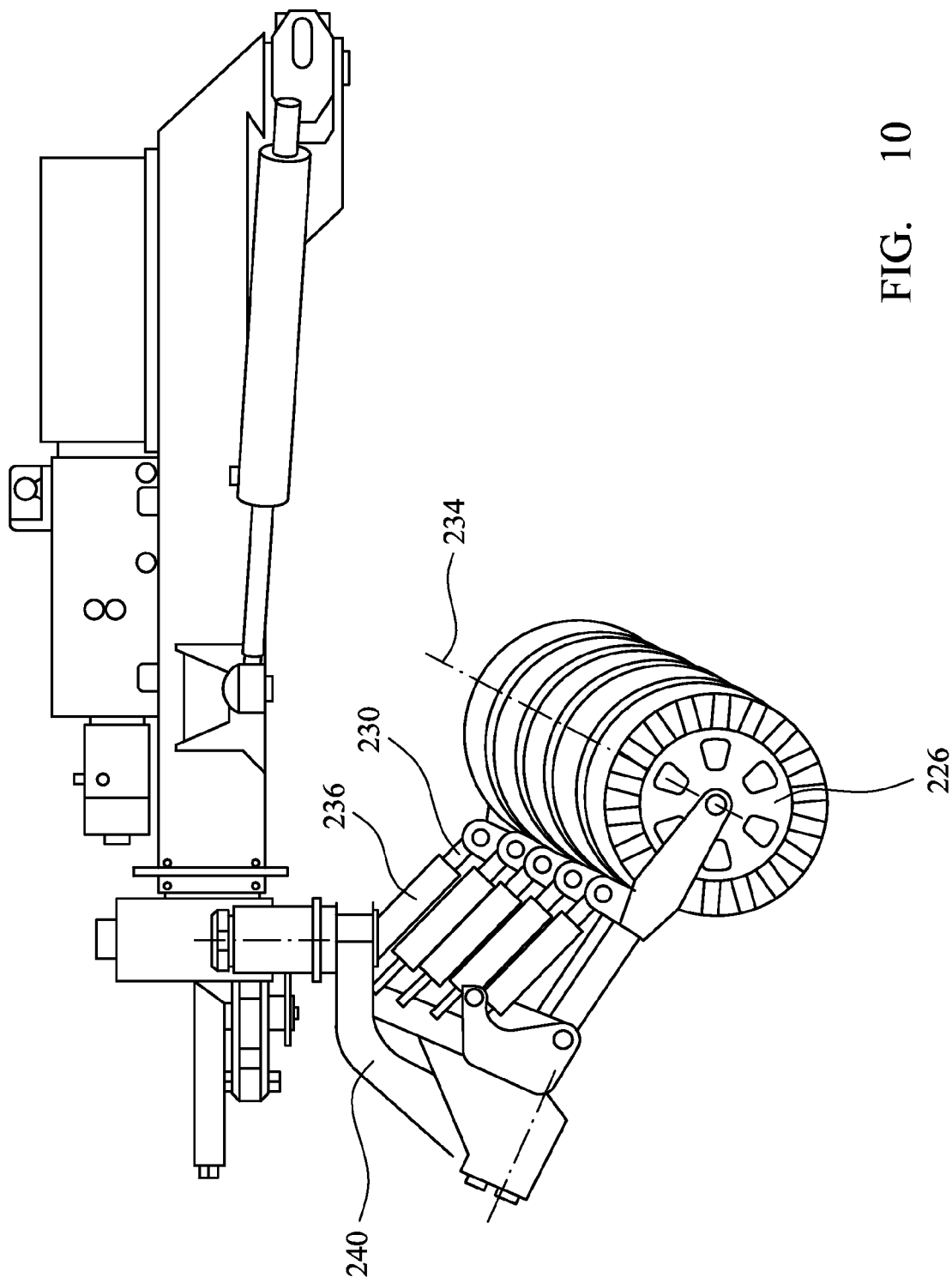
FIG. 10 is a side view of the roller assembly of FIG. 9.
Figure 11:
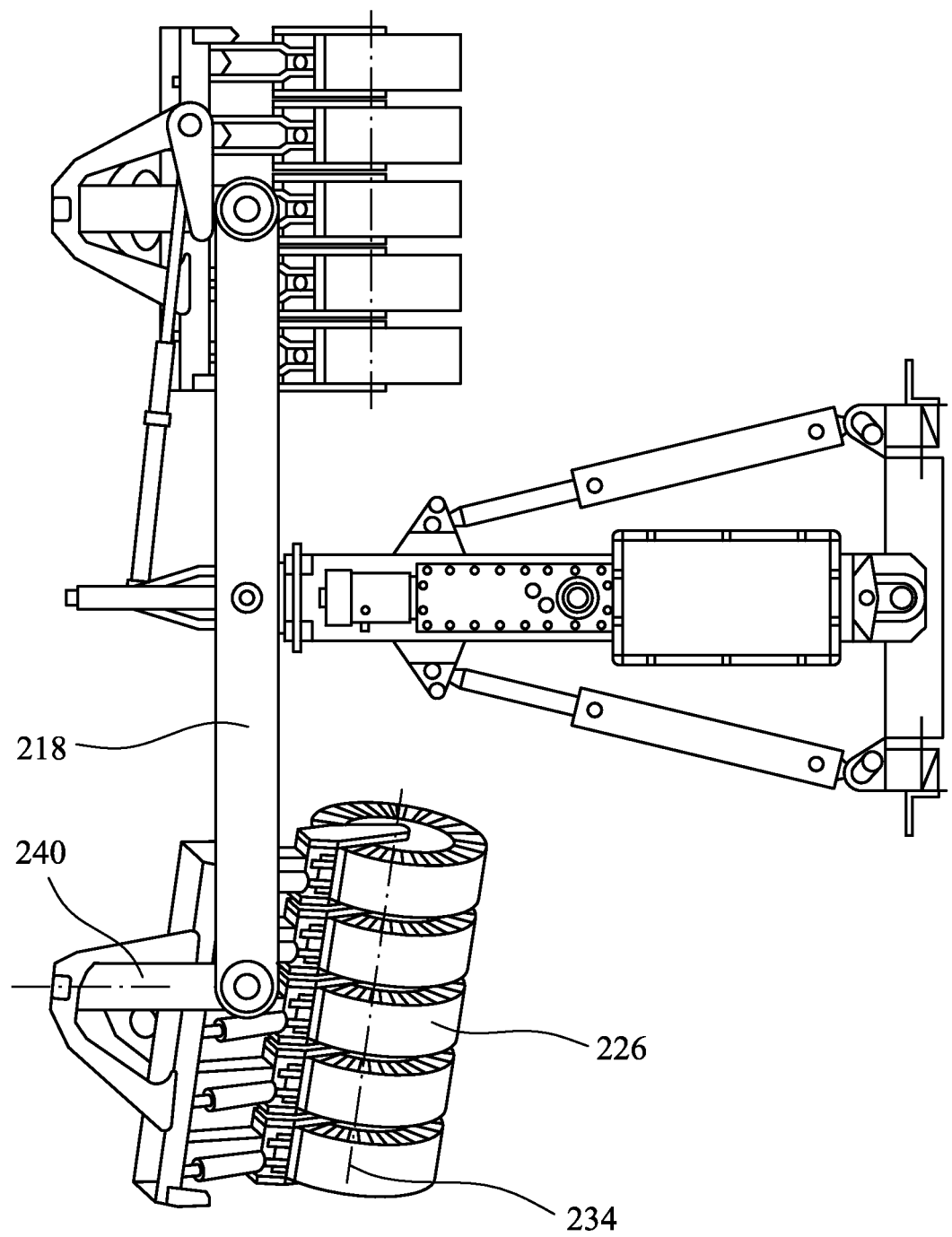
FIG. 11 is a plan view of the roller assembly of FIG. 9.

Each first support member 228 is mounted via a respective first axis in the form of a roll axis 238 to a respective connecting member 240, which in turn is mounted via a respective second axis in the form of a castor axis 242 to the transverse member 218 such that the rollers 226 are arranged rearwardly of the castor axis 242 in the direction of travel of the vehicle. The roll axis 238 is inclined relative to the castor axis 242 such that pivoting movement of the first support member 228 about the roll axis 238 relative to the transverse member 218, as a result of a first torque about an axis parallel to the direction of travel of the vehicle, has a component about an axis transverse to the direction of travel of the vehicle (i.e. about the castor axis 242), as shown by comparing FIGS. 7 and 10. As a result, the line of contact between the rollers 226 and the ground is no longer perpendicular to the direction of travel of the vehicle, which causes the reaction force of the ground acting on the rollers 226 to apply a second torque about the castor axis 242, the second torque acting to oppose the first torque. The second torque in turn urges the rollers 226 to pivot about the roll axis 238 back into a generally horizontal orientation, until the axis of rotation of the rollers 226 of each roller gang 222, 224 is generally perpendicular to the direction of travel of the vehicle, thereby tending to counteract rolling movement (i.e. pivoting about an axis parallel to the direction of travel of the vehicle) of the roller assembly 202.

The operation of the roller assembly 202 will now be described with reference to FIGS. 6 to 11.

The interconnection of the piston cylinders 236 of each roller gang 222, 224 to form a single respective pressure chamber causes the same force to be applied to each roller 226 connected to the same second support member 228. As a result, a roller 226 engaging a depression in the ground, although having its piston 230 extended compared with the other pistons 230 connected to the same second support member 228, does not apply a reduced force to the ground, thereby increasing the likelihood that sufficient force is applied to detonate any explosive device located in that depression. As a result, when the roller assembly 202 rolls about a roll axis parallel to the direction of travel of the vehicle, the suspension of the roller assembly 202 does not generate any moment about the roll axis because the same force is applied to all of the rollers 226 of each roller gang 222, 224.

However, pivoting of one of the roller gangs 222, 224 in response to torque about an axis parallel to the direction of travel of the vehicle, for example as a result of the rollers 226 encountering an uneven ground surface, causes pivoting movement of the first support member 228 about the first axis 238 while the rollers 226 are in contact with the ground. This causes one or more roller gangs 222, 224 to have the orientation shown in FIGS. 9 to 11, such that the line of contact between the rollers 226 and the ground is no longer perpendicular to the direction of travel of the vehicle. This causes the reaction force of the ground acting on the rollers 226 to apply a second torque about the castor axis 242, the second torque acting to oppose the first torque. The second torque in turn urges the rollers 226 to pivot about the roll axis 238 back into a generally horizontal orientation, until the axis of rotation of the rollers 226 of each roller gang 222, 224 is generally perpendicular to the direction of travel of the vehicle, thereby tending to counteract rolling movement of the roller assembly 202 and returning the roller assembly 202 to its horizontal orientation as shown in FIG. 8.

It will be appreciated by persons skilled in the art that the above embodiments have been described by way of example only and not in any limitative sense, and that various alterations and modifications are possible without departure from the scope of the invention as defined by the appended claims. For example, the assembly does not need to be pivotable mounted to the vehicle, but can be rigidly mounted to the vehicle and steered by means of the vehicle's steering.

The invention claimed is:

1. A ground engaging assembly for applying force to the ground, the assembly comprising:
   a body adapted to be mounted to a vehicle for moving the assembly; and
   at least one support device adapted to support a plurality of ground engaging members for applying force to the ground, said support device comprising at least one respective first support member, a plurality of second support members and a plurality of third support members, wherein a plurality of said third support members are adapted to be connected to respective said ground engaging members and at least one said first support member such that each said ground engaging member is connected to the corresponding said first support member by means of a respective said third support member pivotably mounted to said first support member, and wherein each said second support member comprises at least one piston, connected to one of said first support member and a respective said third support member and sliding within a respective piston cylinder, connected to the other of said first support member and said respective third support member, the piston cylinders being interconnected to form a single pressure chamber applying the same pressure to each said piston to resist movement of said ground engaging members in a manner causing compression of fluid in said pressure chamber;
   wherein at least one said first support member is pivotably connected to a respective first connecting member about a respective first axis, said respective first connecting member is mounted to said body about a respective second axis, said second axis extends through a plane containing said first axis and is not perpendicular to said plane containing said first axis, and said first axis extends through a plane containing said second axis and is not perpendicular to said plane containing said second axis, such that pivoting movement of said first support member relative to the body about said first and second axes, as a result of a first torque applied to the assembly about an axis parallel to a direction of travel of the vehicle, causes engagement of the corresponding said ground engaging members with the ground to cause a second torque to be applied to the assembly, and wherein a component of said second torque opposes said first torque.

2. An assembly according to claim 1, wherein said body comprises a first portion adapted to be mounted to the vehicle and a respective connecting member pivotably connected via a respective said first or second axis to at least one said support device and via a respective third axis to said first portion.

3. An assembly according to claim 2, wherein at least one said support device is adapted to support a plurality of ground engaging members such that said ground engaging members engage the ground rearwardly of the corresponding said first or second axis in a direction of travel of the vehicle.

4. An assembly according to claim 2, wherein at least one said connecting member is adapted to be mounted to the corresponding said first support member forwardly of the corresponding said first or second axis in a direction of travel of the vehicle.

5. An assembly according to claim 1, further comprising a plurality of ground engaging members adapted to be supported by at least one said support device.

6. An assembly according to claim 5, wherein a plurality of said ground engaging members comprise rollers.

7. An assembly according to claim 1, further comprising at least one steering device for pivoting said body relative to the vehicle.

8. An assembly according to claim 7, wherein at least one said steering device comprises a plurality of actuators.

9. A ground engaging vehicle comprising a vehicle body and a ground engaging assembly according to claim 1 mounted to the vehicle body.

10. A vehicle according to claim 9, comprising a plurality of said first support members.

11. The assembly of claim 1, wherein at least one said first axis is substantially coplanar with the corresponding said second axis.

* * * * *